J. PRICE.
Combined Stalk-Cutter and Land-Roller.
No. 136,866.                                  Patented March 18, 1873.
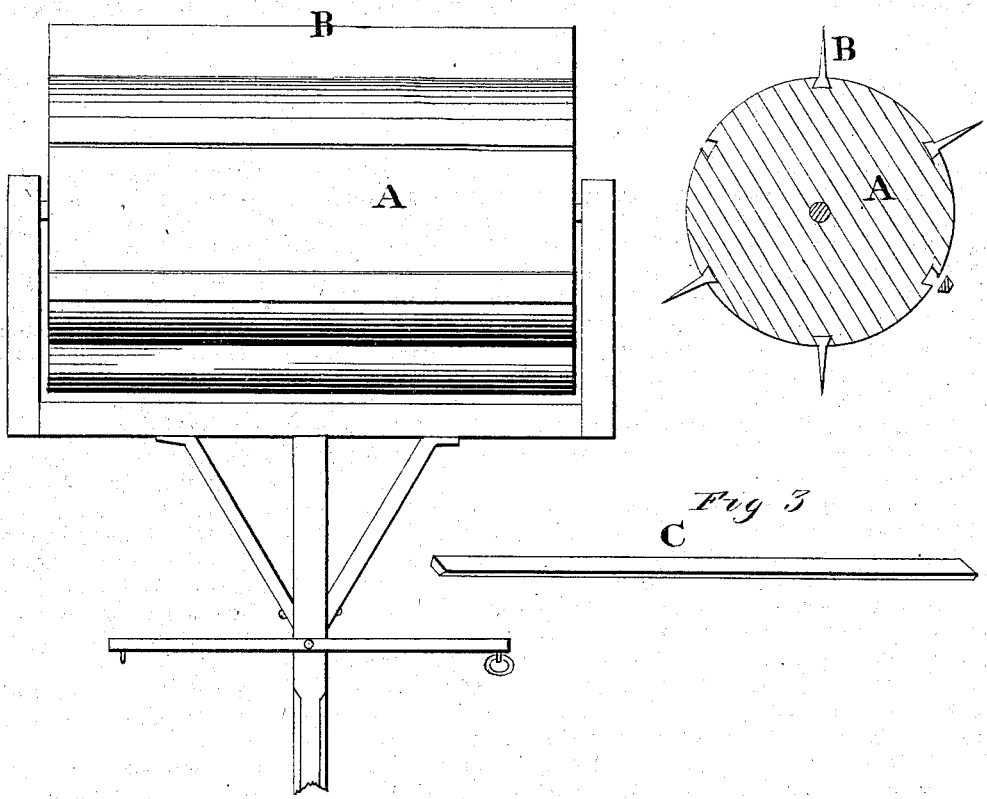
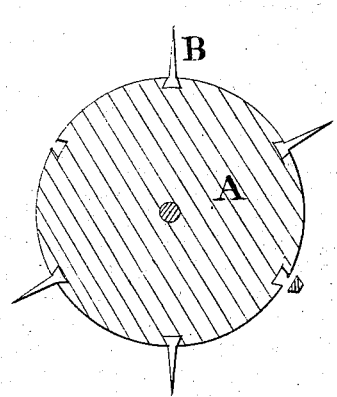
Witnesses:
John Jones
A. H. Stone
Inventor:
Joseph Price
by Warren C. Stone
Attorney.

UNITED STATES PATENT OFFICE.

JOSEPH PRICE, OF COLUMBIA COUNTY, FLORIDA.

IMPROVEMENT IN COMBINED STALK-CUTTERS AND LAND-ROLLERS.

Specification forming part of Letters Patent No. 136,866, dated March 18, 1873.

*To all whom it may concern:*

Be it known that I, JOSEPH PRICE, of the county of Columbia and State of Florida, have invented a new Convertible Stalk-Cutter and Land-Roller; and I do hereby declare that the following is a full, clear, and exact description thereof, which will enable others skilled in the art to make and use the same, reference being had to the accompanying drawing forming part of this specification, in which—

Figure 1 is a plan of my invention; Fig. 2, a cross-section thereof; and Fig. 3, a separate view of one of the parts.

A represents a cylinder of any suitable material, provided with bearings or shaft, to which any frame and pole is attached for operating the same. Longitudinally and at regular intervals around the periphery of said roller I make dovetail grooves about one inch—more or less—deep, into which knife-blades B having backs of corresponding form are inserted by sliding endwise, and then secured by screws or keys, as convenience may suggest. Said blades are, by preference, about three-fourths of an inch thick at their back, and tapering quickly for a short distance and then gradually to an edge, which is made sharp, and are about four inches in width. C represents a strip of wood or suitable material, which exactly fits the groove into which the backs of the knives are inserted, and during that portion of the season when a land-roller is needed and the "cutter" is not the knives may be removed and the strips C inserted into the grooves, when a perfect cylinder is made and the machine is adapted to be used as an ordinary land-roller. It is found necessary, in practice, to have the knives kept quite sharp in order to give good results, and this method of connection affords a ready means of removal and adjustment. The knives may also be taken out and packed away during all that part of the year when the machine is not required as a cutter.

The object of the above-described invention is to provide a means for cutting green vegetation, rank weeds, corn-stalks, and the like, thereby preparing the surface of the ground for the plow, and at the same time adapting the vegetable growth to be "turned under;" and to make the machine convertible as a land-roller, as well as to afford means of ready removal and adjustment for sharpening or packing away the knives.

Having thus fully described my invention, what I claim as new, and desire to secure by Letters Patent, is—

The cylinder A, when provided with dovetail grooves adapted to receive interchangeably the knives B and strips C, as and for the purposes set forth.

Lake City, Florida, January 9, 1872.

JOSEPH PRICE.

Witnesses:
 S. L. NIBLACK,
 A. G. STONE.